US012541719B1

(12) United States Patent
Lu et al.

(10) Patent No.: US 12,541,719 B1
(45) Date of Patent: Feb. 3, 2026

(54) TIME-SERIES DATA FEATURIZATION

(71) Applicant: Intuit Inc., Mountain View, CA (US)

(72) Inventors: Kun Lu, Saratoga, CA (US); Wei Wang, Cupertino, CA (US); Jiaguyue Xu, Fremont, CA (US); Nazanin Zaker Habibabadi, Sunnyvale, CA (US); Diane Zhang Tam, San Diego, CA (US); Nathan Osborne, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/223,986

(22) Filed: May 30, 2025

(51) Int. Cl.
*G06N 20/00* (2019.01)
*G06F 17/40* (2006.01)

(52) U.S. Cl.
CPC .............. *G06N 20/00* (2019.01); *G06F 17/40* (2013.01)

(58) Field of Classification Search
CPC ................................ G06N 20/00; G06F 17/40
See application file for complete search history.

(56) References Cited

U.S. PATENT DOCUMENTS

| | | | |
|---|---|---|---|
| 2014/0207791 A1* | 7/2014 | Danilevsky | G06F 16/24578 707/748 |
| 2017/0228651 A1* | 8/2017 | Yamamoto | G16H 10/40 |
| 2025/0086397 A1* | 3/2025 | Conort | G06F 16/2456 |

* cited by examiner

*Primary Examiner* — Casey R. Garner
(74) *Attorney, Agent, or Firm* — Dinsmore & Shohl LLP (57) ABSTRACT

The present disclosure relates to methods, systems, and apparatuses for featurizing time-series data to enhance machine learning model training. Time-series data, such as transaction records, is preprocessed to identify fields including descriptive and categorical information. Categories are assigned using a first machine learning model, and tags are applied based on domain-specific patterns or large language models. The processed data is organized into a star schema data structure comprising a fact structure and associated dimension structures. Features are generated from the data structure based on time windows, incorporating statistical metrics and identified patterns. These features are provided to a machine learning module to train a second machine learning model, improving accuracy and adaptability for applications such as customer behavior prediction and financial analysis. The disclosed approach addresses challenges of high dimensionality, noise, and temporal dependencies in time-series data, enabling robust and contextually relevant feature generation.

20 Claims, 7 Drawing Sheets

TIME-SERIES DATA FEATURIZATION

BACKGROUND

Field

Aspects of the present disclosure relate to featurization of data.

Description of Related Art

Generative artificial intelligence (GenAI) refers to machine learning models that are able to create new content based on patterns and information learned from training data in combination with a user prompt. The user prompt provides instructions to the model on what new content to generate and how to generate that new content. Notably, the model is able to generate new content based on both the actual information (e.g., facts and knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens. At its core, an LM attempts to predict the probability of the next word in a sentence given the preceding words. The model estimates these probabilities based on the patterns it learned during training. LMs are useful in natural language processing (NLP) and computational linguistics for performing a range of tasks involving human language.

Featurization is the process of transforming raw data into a structured set of features that can be used as input for machine learning models such as GenAI models. This process involves extracting meaningful attributes and patterns from the data to create a representation that captures its characteristics. The goal of featurization is to convert complex, unstructured data into a format that is suitable for analysis and modeling, enabling machine learning algorithms to learn from the data and make predictions or decisions.

SUMMARY

Certain aspects provide a method. The method includes storing time-series data regarding a plurality of transactions; obtaining the time-series data from the data storage module; preprocessing the time-series data to identify a set of fields included in the time-series data, the set of fields including one or more descriptive fields; assigning, using a first machine learning model and based on the one or more descriptive fields, categories to the time-series data; assigning tags to the time-series data based on a set of patterns associated with the set of fields, wherein the set of patterns are based on a domain associated with the time-series data; generating a data structure based on the time-series data, wherein the data structure includes: a fact structure including information of the set of fields, and a set of dimension structures associated with the fact structure, wherein the set of dimension structures are based on the categories or the tags; generating a set of features based on the data structure and based on a time window; providing the set of features to a machine learning module; and training a second machine learning model based on the set of features.

Certain aspects provide a method of processing time-series data performed by an apparatus. The method includes obtaining time-series data regarding a plurality of transactions; preprocessing the time-series data to identify a set of fields included in the time-series data; assigning categories to the plurality of transactions; assigning tags to the plurality of transactions based on a set of patterns associated with the set of fields; generating a data structure based on the time-series data, wherein the data structure includes: a fact structure including information relating to the set of fields, and a set of dimension structures, wherein the set of dimension structures are based on the categories or the tags and are associated with the fact structure; generating a set of features based on the data structure and based on a time window; and providing the set of features.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for time-series data featurization.

Time-series data is characterized by data points indexed in time order, often capturing a sequence of events or transactions over a time interval. This type of data is prevalent in various domains, including finance, where time-series data is used to track transactions, stock prices, and economic indicators, as some examples. The temporal aspect of time-series data allows for the analysis of trends, patterns, and anomalies over time, providing insights that can inform decision-making processes. In the context of transactions, time-series data can include information such as transaction amounts, timestamps, and categorical details, which are useful for understanding customer behavior and financial activities.

Featurization, in the context of artificial intelligence (AI) and machine learning (ML), involves the transformation of raw data into (or the derivation from raw data of) a set of features that can be used to train or run ML models. "Featurization" may be referred to as "feature engineering." The quality and relevance of these features impact the performance and accuracy of the models. In the context of time-series data, featurization involves extracting meaningful patterns and attributes from the data, which can be used to predict future events or classify current states. The features generated as part of featurization can include any number of features, such as numerical features (e.g., scaled values, mathematical transformations, statistical aggregations); categorical encodings (e.g., one-hot, label, target encoding); text representations (e.g., TF-IDF, word embeddings, n-grams); time series components (e.g., frequency domain transformations, trend extraction, autocorrelation); interaction features (e.g., combinations, ratios between existing features); spatial features (e.g., coordinate transformations, distance measures, density calculations); or graph/network characteristics (e.g., centrality measures, community detection, node embeddings).

A technical challenge with processing time-series data for featurization, particularly in the context of a plurality of transactions, lies in its complexity and volume. Traditional methods of featurization often face technical difficulties in effectively handling the diverse and dynamic nature of such data. One issue is the inability to adequately capture temporal dependencies and relationships within the data. Many approaches rely on static features that do not account for the sequential nature of time-series data, leading to a loss of temporal information. Additionally, these methods may struggle with the high dimensionality (e.g., a high number of features or attributes used to represent observations in a dataset) and noise inherent in transaction data, resulting in feature sets that are either too sparse or too dense, making it challenging to extract meaningful insights. Another technical problem is the limited ability of some techniques to integrate domain-specific knowledge and contextual information into the feature generation process. Without incorporating business logic or domain expertise, the features generated may not fully capture the nuances of the data, reducing their relevance and effectiveness for specific applications. This limitation can hinder the development of robust predictive models that use a deep understanding of the underlying data dynamics. Furthermore, some techniques lack the flexibility to adapt to evolving patterns and trends present in time-series data, which can lead to inconsistencies in model outputs.

Aspects described herein address technical challenges associated with featurization techniques by introducing a systematic approach to processing time-series transaction data. By leveraging data mining techniques (such as categorization and tagging), aspects described herein preprocess raw data, categorize information of the (e.g., preprocessed) raw data, and tag the (e.g., preprocessed) raw data. For example, aspects described herein may use ML models for categorization, and pattern recognition techniques for tagging, which incorporate domain knowledge and large language models. By doing so, aspects described herein capture both the temporal dependencies and the contextual nuances of the data, providing for the features generated to be both comprehensive and relevant.

In some aspects described herein, processed transaction data is transformed into a star schema format, which includes a fact table and multiple dimension tables associated with the fact table. This structured format allows for efficient aggregation and analysis of data across various dimensions, addressing the issue of high dimensionality and noise. By organizing the data in this way, aspects described herein facilitate the generation of features that accurately reflect the underlying patterns and trends in the data. The use of certain (e.g., orthogonal) algorithms to analyze these dimensions further enhances the quality of the features, providing a robust representation of the data that is adaptable to evolving patterns.

Aspects of the present disclosure may be used to realize one or more of the following potential advantages. By providing a comprehensive and flexible framework for feature generation, aspects described herein improve the accuracy and performance of machine learning models, thereby reducing processing resource usage associated with obtaining a given inference. The features generated are not only statistically robust but also contextually relevant, enabling more precise predictions and insights relative to features that are generated without regard to context. This approach reduces inconsistencies in model outputs and improves the ability to capture complex relationships within the data. Furthermore, aspects described herein are applicable (e.g., well-suited) for a wide range of applications, such as customer behavior prediction, involving time-series data.

Example System

Figure 1:
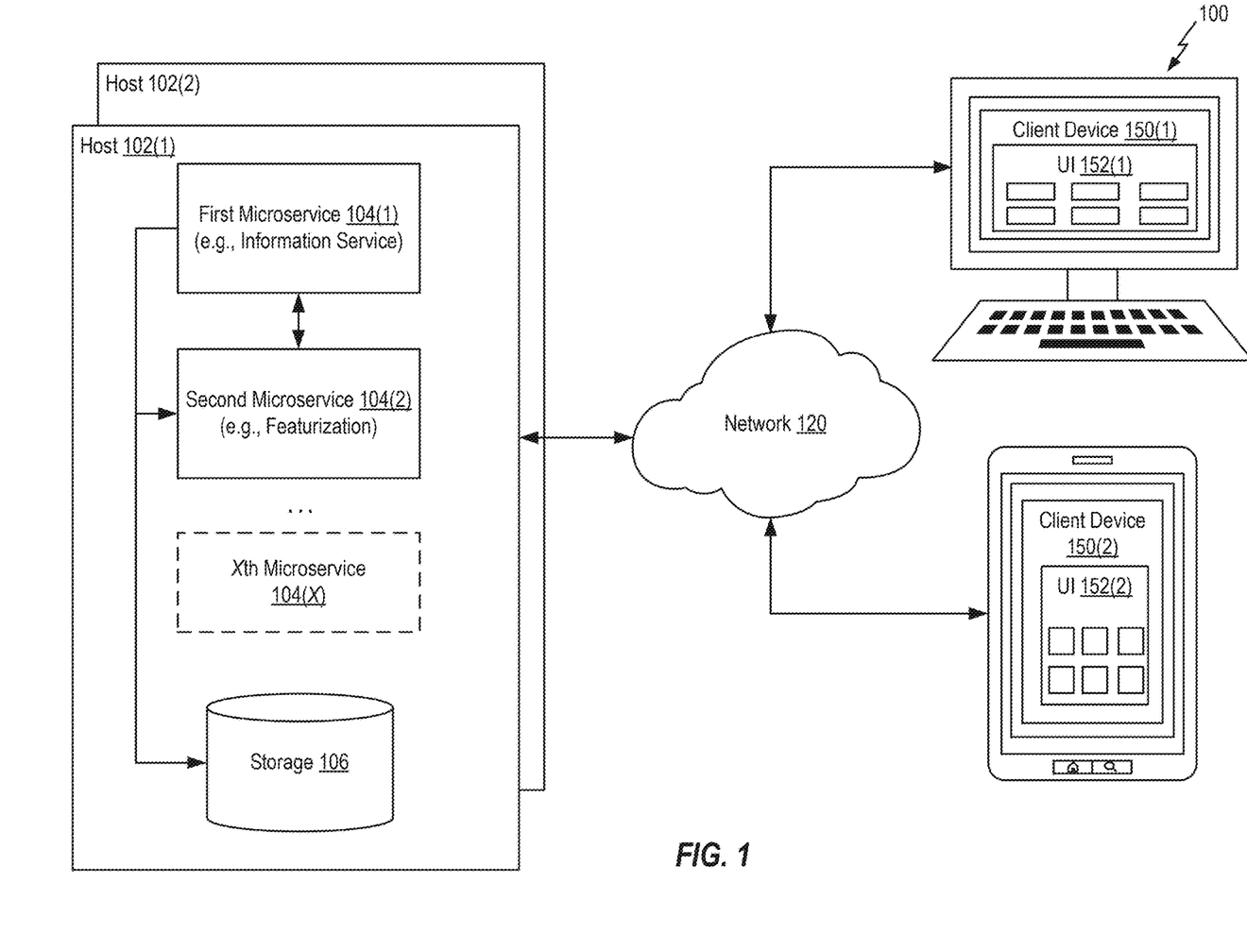
FIG. 1 is a schematic system diagram illustrating an example processing system supporting microservices interconnected via a network.

FIG. 1 depicts an example system 100 supporting a plurality of microservices 104 (e.g., software-defined services, which in some cases, may be cloud-native). As shown in FIG. 1, system 100 includes client devices 150(1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Host 102 may be geographically co-located servers on the same rack or on different racks in any arbitrary location in a data center. Host 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another microservice 104, through the X-th microservice 104(X) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, in certain aspects, the first microservice 104(1) implements an information service, which is any network 120 accessible service that maintains time-series data and/or other data types. In certain aspects, the information service stores its data in storage 106. In some aspects, the information service is configured as a contact management system, in which users are able to manage a plurality of local and network contacts associated with different entities with which the users engage in business communications. In certain aspects, the second microservice 104(2) implements a featurization service. The featurization service may be a service used to extract features from time-series data, as described with respect to FIGS. 2-4. In some aspects, the featurization service or another microservice 104 may implement a machine learning module that trains a machine learning model using features extracted from the time-series data. A microservice 104, or a host 102 that implements a microservice 104, may be referred to as an apparatus.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any host 102 where microservices 104 are deployed.

Figure 2:
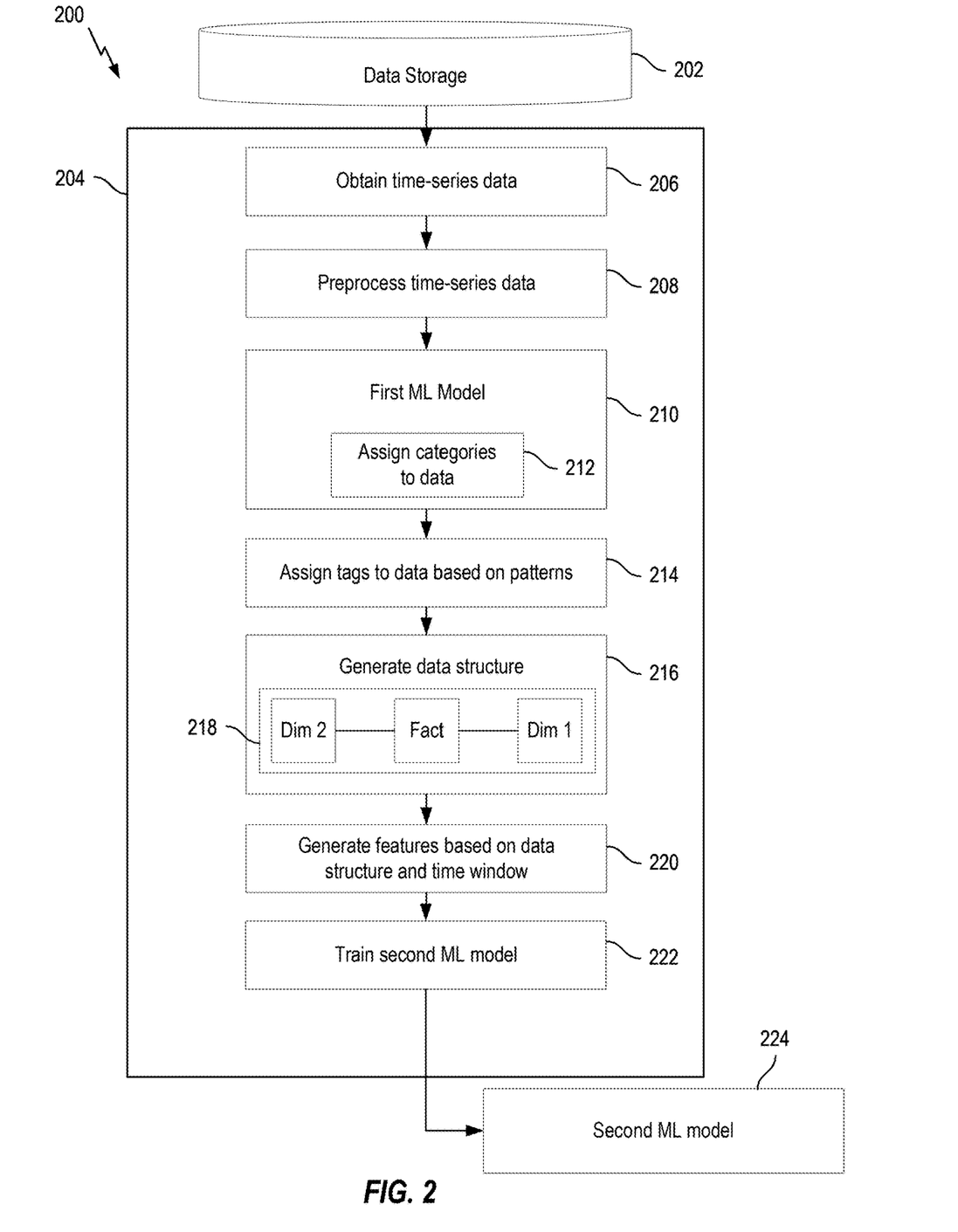
FIG. 2 is a schematic flow chart diagram illustrating an example method for processing time-series data to generate features for training a machine learning model.

FIG. 2 shows an example 200 of operations performed by a processing system 204 to transform raw time-series data into features suitable for training machine learning models. Example 200 integrates data mining, categorization, tagging, and feature generation.

A data storage module 202 (e.g., storage 106) stores raw time-series data. "Raw" time-series data may include time-series data which has not been pre-processed, tagged, categorized, or otherwise processed. For example, time-series data may include transaction record. A transaction record may include information regarding a transaction, such as a timestamp, an amount (e.g., a monetary amount), a categorical field (e.g., a field defining a predefined category that can be directly used to group transactions, such as "groceries," "utilities," or "entertainment"), or a descriptive field (e.g., a text-based field containing information about the transaction, such as descriptions, notes, or labels).

As mentioned, the time-series data may include a categorical field. The categorical field may differ from a categorization assigned by a first ML model 210 at 212. For example, the categorical field may provide categorization according to predefined, static categories, whereas categories assigned at 212 may be context-sensitive and dynamic based on the time-series data. Thus, categorization at 212 provides added granularity and enrichment of the time-series data even when categorical fields are present in the time-series data.

At 206, the processing system 204 obtains the time-series data from the data storage module 202. For example, the processing system 204 may retrieve raw time-series data from the data storage module 202. In some aspects, the time-series data may include noisy and unstructured information, such as bank statements or e-commerce transaction logs, which may be of limited use for certain applications such as training a second ML model 224.

At 208, the processing system 204 preprocesses the time-series data that was obtained at 206. Pre-processing may include applying data cleaning and/or transformation techniques to prepare the raw time-series data for further analysis. For example, the processing system 204 may identify fields within the time-series data, such as timestamp fields for sorting, amount fields for aggregation, categorical fields for dimension creation, and descriptive fields for tagging. Preprocessing ensures the data is structured and ready for machine learning applications.

At 212, a first ML model 210 assigns categories to the pre-processed time-series data. For example, the processing system 204 may use the first ML model 210 to assign the categories. The first ML model 210 may use an ML technique such as supervised multi-class classification to classify transactions into categories. For example, transactions may be categorized as "late payment fee," "subscription renewal," or "refund." The first ML model 210 may include any suitable ML model, such as a classification model (e.g., an artificial neural network, a random forest model, a gradient boosting model, a support vector machine, or the like).

At 214, the processing system 204 assigns tags to the time-series data (also referred to as tagging the time-series data) based on a set of patterns associated with the fields of the time-series data. For example, the set of patterns may provide for identification of characteristics of groups of transactions that are separated in time. As a more particular example, a pattern may provide for a first transaction and a second, later transaction to be tagged "inter-account transfer" or "refund" based on amounts of the transactions matching one another and based on description fields of the transactions. In some aspects, the set of patterns may be based on domain knowledge or business logic (for example, the set of patterns may be defined by a user or domain expert). Additionally, or alternatively, the set of patterns may be based on an ML model such as an LLM. Tagging the time-series data provides additional context and granularity that can be used to extract features from the time-series data for training of the second ML model 224.

It should be noted that categorization can be performed before tagging or after tagging. Additionally, or alternatively, tagging and categorization may be performed in a same operation or set of operations. Tagging may differ from categorization in that tagging is based on a pattern applying to multiple transactions of the time-series data, whereas categorization is based on a single transaction of the time-series data. Furthermore, it should be noted that a single row of time-series data (such as an index and corresponding fields for the index) is referred to herein as a "transaction" even in contexts where the time-series data does not relate to monetary transactions, and aspects described herein are not limited to those involving monetary transactions.

At 216, the processing system 204 transforms the time-series data (which may have been pre-processed, categorized, and/or tagged) into a data structure 218. The data structure 218 uses a star schema modeling approach. The data structure 218 includes a fact structure and a set of dimension structures. The fact structure contains transactional information, such as amounts and timestamps, while the dimension structures represent categories and tags derived from the previous steps. For example, dimensions may include "income," "payments," or "bank fees." The star schema enables efficient aggregation and analysis along multiple dimensions. Additional detail regarding the data structure 218 is provided in connection with FIG. 4.

At 220, the processing system 204 generates features based on the data structure and a time window. For example, the processing system 204 may aggregate the data across specified time windows, such as daily, weekly, or monthly intervals, a time window associated with a set of transactions, or the like. The features may include, for example, numerical features (e.g., scaled values, mathematical transformations, statistical aggregations); categorical encodings (e.g., one-hot, label, target encoding); text representations (e.g., TF-IDF, word embeddings, n-grams); time series components (e.g., frequency domain transformations, trend extraction, autocorrelation); interaction features (e.g., combinations, ratios between existing features); spatial features (e.g., coordinate transformations, distance measures, density calculations); distributional metrics (e.g., Gini index); or graph/network characteristics (e.g., centrality measures, community detection, node embeddings).

Generating the features based on the time window improves responsiveness of the features to characteristics of the data and improves the likelihood that the extracted features are relevant and descriptive of the characteristics of the data. To generate features, the processing system may apply a set of algorithms. The set of algorithms may include statistical algorithms (e.g., generating statistical metrics) or the like. These algorithms may be applied to each dimension and time window to generate features that characterize the data.

At 222, the processing system trains a second ML model 224 based on the generated features. The second ML model 224 is trained using the features generated from the processed time-series data. Training an ML model involves feeding the ML model structured input data (features) and corresponding output labels (if supervised learning is used) to enable the ML model to learn patterns and relationships within the data. The features generated at 220, such as aggregated transaction amounts, statistical metrics, or tagged attributes, are used as the input data for the training process. These features may capture the temporal dependencies, categorical relationships, and granular transaction attributes, ensuring that the second ML model 224 has access to high-quality data for learning.

In some aspects, the training dataset (e.g., the features and corresponding time-series data) is split into training, validation, and testing subsets. The training subset is used to train second ML model 224 by exposing second ML model 224 to the input features and their corresponding labels or outcomes. The validation subset is used to tune hyperparameters and evaluate second ML model 224's performance during training, ensuring that second ML model 224 generalizes well to unseen data. Then, the testing subset is used to assess the accuracy and robustness after training is complete.

During training, second ML model 224 (e.g., using an ML algorithm) iteratively adjusts its parameters (e.g., weights and biases) to minimize the error between predictions and the labels of the training dataset. For example, second ML model 224 may adjust the parameters using an optimization algorithm such as stochastic gradient descent (SGD) or Adam. The features generated at 220 provide second ML model 224 with structured and meaningful data that captures the underlying patterns in the transactions. For example, features like trend analysis, category proportions, and tagged attributes enable second ML model 224 to identify correlations between transaction information (e.g., spending behavior) and customer churn, or other outcomes.

The second ML model 224 can be applied to various use cases, depending on the specific features and labels used during training. One example of a use case is customer lifetime value prediction, where second ML model 224 estimates the long-term value of a customer to a business by analyzing their spending patterns and transaction frequency, referred to as customer lifetime value (CLV). As another example, second ML model 224 can perform churn analysis, predicting the probability of a customer discontinuing their relationship with a business based on changes in the customer's transaction behavior.

For example, in CLV, groups of transactions may be tagged based on recency of a purchase by the customer (e.g., last month, last quarter, or last year) and/or a monetary value of a set of transactions (e.g., low spender, medium spender, high spender). Transactions may be categorized based on a type of product purchased and/or a frequency of purchases. Aspects described herein provide for derivation of features from the tagged and/or categorized transactions and training of the second ML model 224 to output a CLV for a customer based on a set of transactions associated with the customer.

As another example, in churn modeling, aspects described herein may tag customers' engagement level (e.g., as active, moderately active or inactive) using their website navigation patterns, such as views, time spent on site, cart abandonment, or interactions with marketing emails and socials. These engagements may be reflected in time-series data related to the customers. Additionally, or alternatively, aspects described herein may assign a customer satisfaction level categorization, such as based on positive or negative feedback associated with a customer. These tagged and/or categorized data (or features derived from the data) are used as inputs to train the second ML model 224, and to predict a churn associated with a customer using the second ML model 224.

As another example, second ML model 224 may perform functions related to personalization or targeting of advertisements. In this case, the processing system 204 may tag transactions associated with seasonal patterns (e.g., which may indicate if a customer is interested in a product based on their bank transactions in specific periods), repeated purchases or transactions (e.g., transactions occurring at a threshold frequency may be tagged), recent purchases or transactions (e.g., transactions related to a most recent purchase or set of purchases may be tagged), or forecasting of future needs (e.g., historical patterns of purchasing or trends may be tagged, enabling forecasting of future patterns or trends based on these historical patterns or trends). Aspects described herein may build a profile (e.g., a table, a set of dimension structures, or a combination thereof) according to tags derived from the time-series data using the featurization techniques described herein. From this profile, features may be derived for training the second ML model 224, inferring personalization or targeting information for advertisements, or the like.

By leveraging the features generated at 220, the second ML model 224 achieves improved accuracy and performance across these applications. The structured data provided by the star schema and the granular insights from tagging and categorization ensure that second ML model 224 can effectively capture complex relationships within the data. This enables informed decisions, such as optimizing marketing strategies or improving customer retention efforts.

Figure 3:
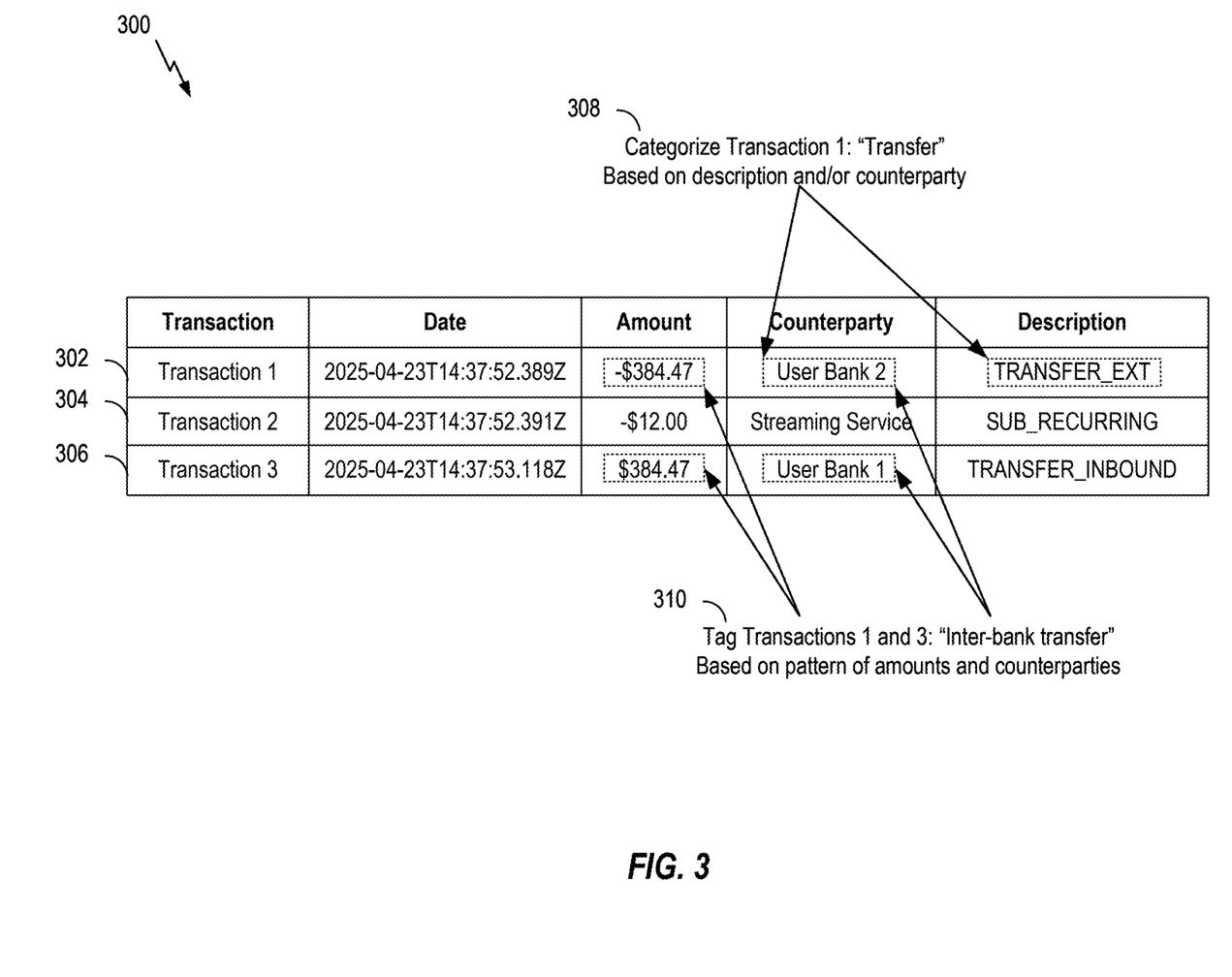
FIG. 3 illustrates a schematic table diagram depicting the categorization and tagging of transactions based on descriptive fields and patterns.

FIG. 3 is a diagram illustrating an example 300 of categorizing a transaction of a set of transactions and assigning a tag to the set of transactions. Example 300 includes a first transaction 302, a second transaction 304, and a third transaction 306. These transactions may be included in time-series data, such as the time-series data obtained at 206 by the processing system 204. In some aspects, the processing system 204 may perform pre-processing of the time-series data to generate the first transaction 302, the second transaction 304, and the third transaction 306. As shown, each of these transactions includes a timestamp field, an amount field, a counterparty field, and a description field.

As shown by 308, the processing system 204 may assign a category to the first transaction 302. For example, the processing system 204 may input the first transaction 302 to a first ML model 210, and the first ML model 210 may output an indication of the category. The category may be based on the first transaction 302. Here, the category is "transfer," indicating that the first transaction 302 is a monetary transfer. This may be based on the description field, the counterparty field, or a combination thereof. As shown, the "transfer" category is also assigned to the third transaction 306.

As shown by 310, the processing system 204 may assign a tag to the first transaction 302 and the third transaction 306. The tag indicates that the first transaction 302 and the third transaction 306 are part of an inter-bank transfer. The processing system 204 may assign the tag based on a pattern of a set of patterns. For example, the pattern may indicate that two transactions associated with (1) a same absolute value of an amount (where one of the two transactions is associated with a positive value of the amount and the other of the two transactions is associated with a negative value of the amount) and (2) counterparties that are banks, are to be tagged as an inter-bank transfer.

In some aspects, the tagging may be based on keyword patterns derived from categorical fields or descriptive fields of the time-series data. A keyword pattern is a predefined or dynamically generated rule that identifies specific words, phrases, or combinations of text based on which to assign tags. For example, in financial transactions, a keyword pattern may identify the word "refund" in a description field and tag the transaction as "refund-related" if a prior transaction indicates a purchase related to the transaction including the word "refund." More complex keyword patterns may involve contextual rules, such as identifying transactions with the word "transfer" in the description field and matching them with counterparties that are banks to tag the transaction as "inter-bank transfer," as described above. These patterns can also incorporate regular expressions to handle variations in spelling, formatting, or phrasing, ensuring robust tagging across diverse datasets. In some aspects, keyword patterns may be dynamically updated using machine learning models, such as LLMs, to capture emerging behaviors or categories based on historical data trends. By leveraging keyword patterns, the tagging process enriches time-series data with contextual information, enabling the generation of high-quality features for machine learning applications and addressing the technical challenges of traditional featurization methods.

Thus, the processing system 204 can enrich the time-series data comprising the transactions 302, 304, and 306 by providing categorization and tagging of the transactions 302, 304, and 306. These tags and categories can be used to create a data structure using a star schema, as described in connection with FIG. 4. The data structure may support featurization of the time-series data, for example, based on applying algorithms or other forms of interpretation to the time-series data.

Figure 4:
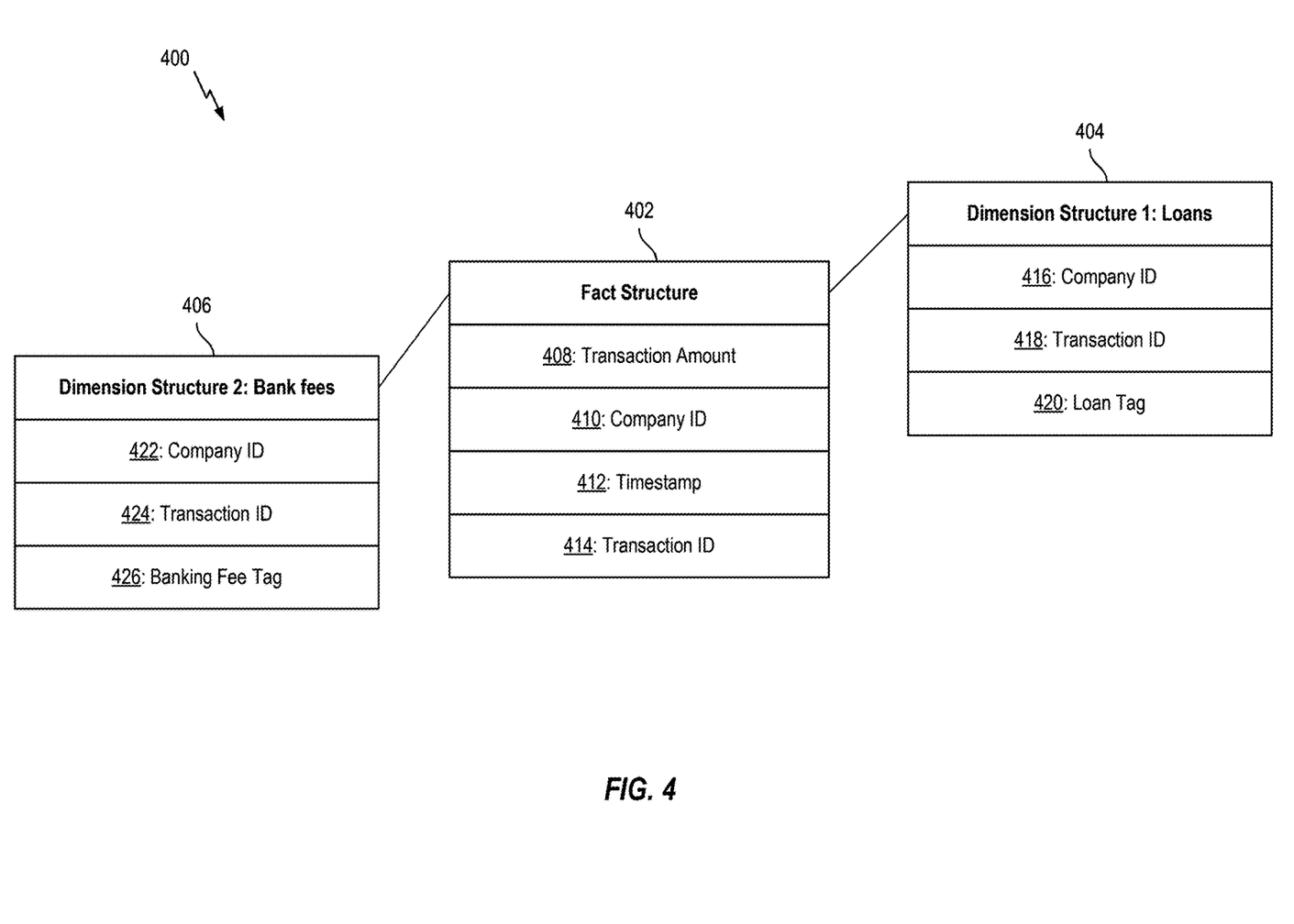
FIG. 4 illustrates a schematic block diagram of a star schema data structure for organizing time-series transaction data.

FIG. 4 illustrates a data structure 400 that uses a star schema, which is generated as described in FIGS. 2 and 3. The data structure 400 includes a fact structure 402 and a number of dimension structures (here, dimension structures 404 and 406). The dimension structures 404 and 406 are associated with the fact structure 402 based on each dimension structure 404/406 including a key from the fact structure 402. This organization enables efficient aggregation and analysis of transaction data across multiple dimensions, addressing the challenges of high dimensionality and noise in time-series data.

The fact structure 402 may be considered a central table. The fact structure 402 contains quantitative data or metrics that are the focus of analysis (for example, quantitative data, field values, or the like from the time-series data). Fact structure 402 represents the core transactional information, such as transaction amounts, timestamps, and other measurable attributes. Each row in fact structure 402 corresponds to a specific event or transaction. Fact structure 402 is linked to dimension structure 404 and dimension structure 406 through keys, enabling aggregation and analysis across multiple dimensions. For example, fact structure 402 may include fields such as an amount field 408, a company identifier field 410, a timestamp field 412, and a transaction ID field 414. The amount field 408 represents the numerical value of each transaction. The company identifier field 410 provides information about the entity involved in the transaction, such as a vendor, counterparty, customer, or party executing the transaction. The timestamp field 412 captures the timestamp associated with each transaction, enabling time-based sorting and aggregation. The transaction ID field 414 includes a transaction identifier associated with each transaction. These fields are derived from the preprocessing step described in FIG. 2 at 208, and may be examples of the timestamp, amount, and counterparty fields described in connection with FIG. 3. The fact structure 402 may include additional or alternative information, such as a description field (e.g., a plain text description associated with the transaction) or the like.

A dimension structure, such as dimension structure 404 or dimension structure 406, in the star schema is a table that provides descriptive context and additional attributes related to the data in fact structure 402. Dimension structure 404 and dimension structure 406 contain categorical or qualitative information that enriches the analysis by offering perspectives on the data in fact structure 402. Dimension structure 404 and dimension structure 406 are used to group, filter, or categorize the data in fact structure 402, enabling multidimensional analysis. For instance, dimension structure 404 and dimension structure 406 in the aspects described herein may include attributes such as transaction categories (e.g., "transfer," "utilities"), tags (e.g., "penalty,"

"inter-bank transfer"), or recurring patterns. Dimension structure 404 and dimension structure 406 are mapped to (e.g., associated with) fact structure 402 via keys, allowing for efficient aggregation and exploration of data across various dimensions. In some aspects, a dimension structure 404 or 406 may indicate a tag or a category associated with a transaction, as described below.

Dimension structure 404 includes a key 416 corresponding to a company ID field 410 from the fact structure 402, a key 418 corresponding to a transaction ID field 414 from the fact structure 402, and associates the keys 416 and 418 with a dimension 420 indicating that the keys 416 and 418 (e.g., a transaction associated with the keys 416 and 418) is associated with a loan. This may be based on the tagging described with respect to FIG. 2. Thus, dimension structure 404 provides information regarding a given transaction or set of transactions by associating information from the fact structure 402, relating to the given transaction or set of transactions, with a dimension 420. Similarly, dimension structure 406 includes a key 422 corresponding to a company ID field 410 from the fact structure 402, a key 424 corresponding to a transaction ID field 414 from the fact structure 402, and associates the keys 422 and 424 with a dimension 426 indicating that the keys 422 and 424 (e.g., a transaction associated with the keys 422 and 424) is associated with a bank fee. These attributes are generated during the tagging and categorization steps in FIGS. 2 and 3, and are integrated into the star schema during the data structure generation step in FIG. 2 at 216. Notably, the same dimension can be applied to multiple keys. For example, a first set of keys (corresponding to a first set of transactions) can all be associated with a first dimension indicating that the first set of transactions are associated with a first loan or type of bank fee, and a second set of keys (corresponding to a second set of transactions) can all be associated with a second dimension indicating that the second set of transactions are associated with a second loan or type of bank fee.

The star schema format is particularly beneficial because it organizes data into a logical structure that supports efficient aggregation and analysis along multiple dimensions. By denormalizing the schema, as described in FIG. 2 at 216, aspects described herein improve performance while retaining the ability to analyze data across categories, tags, and time windows. This structured approach ensures that the data is both statistically robust and contextually relevant, enabling the generation of high-quality features that capture temporal dependencies, categorical relationships, and granular transaction attributes. These features improve the accuracy and utility of machine learning models, addressing the technical challenges of traditional featurization methods, particularly in the context of time-series data.

For example, the fact structure 402 and dimension structures 404 and 406 enable rapid and efficient construction of combined tables. A combined table could be created, for example, for a given company ID (indicated by company ID field 410) and transaction ID (indicated by transaction ID field 414) by querying the fact table 402, dimension table 404, and dimension table 406 in relation to the given company ID and transaction ID. Thus, the dimensions 420 and 426 can be incorporated into the combined table, enabling association of transactions and companies with various dimensions (such as tags and categories) without fundamentally reconstructing the fact structure 402. From the combined table (or the dimension structure(s) and/or fact structure), features can be extracted which can facilitate training of the second ML model 224.

Figure 5:
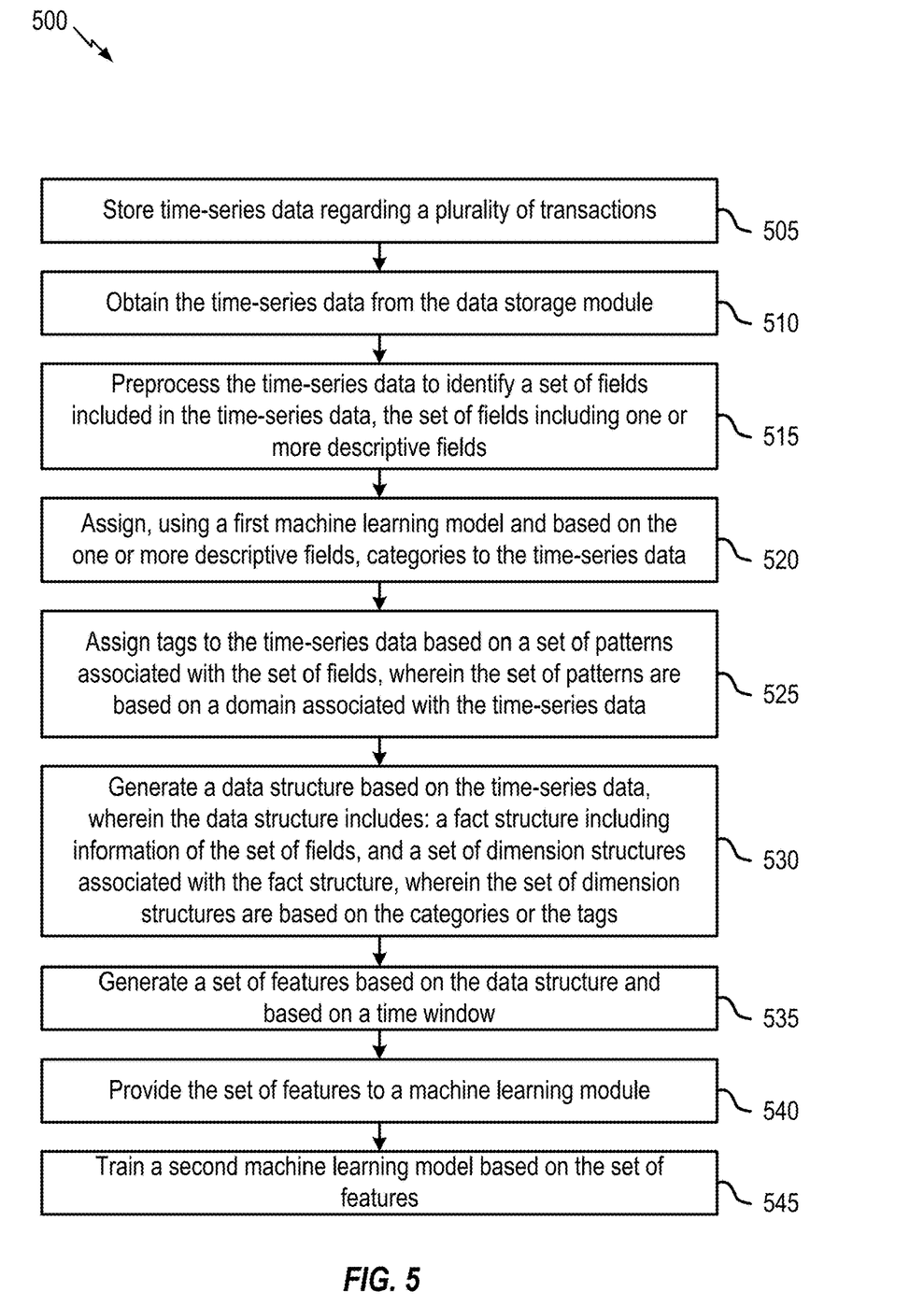
FIG. 5 illustrates a schematic flow chart diagram of a method for processing time-series data to generate features for machine learning model training.

FIG. 5 depicts an example method 500 for processing time-series data. In some aspects, method 500 can be implemented by the processing system 204 of FIG. 2, a host 102, microservice 104, or client device 150 of FIG. 1, and/or processing system 700 of FIG. 7.

Method 500 starts at block 505 with storing time-series data regarding a plurality of transactions. This is described in connection with the data storage module 202 in FIG. 2, which stores raw time-series data for subsequent processing.

Method 500 continues to block 510 with obtaining the time-series data from the data storage module. This is described in connection with 206 in FIG. 2, where the processing system 204 retrieves the stored time-series data from the data storage module 202.

Method 500 continues to block 515 with preprocessing the time-series data to identify a set of fields included in the time-series data, the set of fields including one or more descriptive fields. This is described in connection with 208 in FIG. 2, where the processing system 204 preprocesses the raw time-series data to clean and structure it, identifying fields such as timestamp, amount, categorical, and descriptive fields.

Method 500 continues to block 520 with assigning, using a first machine learning model and based on the one or more descriptive fields, categories to the time-series data. This is described in connection with 212 in FIG. 2, where the first machine learning model 210 assigns categories to the preprocessed data, enriching it with context-sensitive classifications.

Method 500 continues to block 525 with assigning tags to the time-series data based on a set of patterns associated with the set of fields, wherein the set of patterns are based on a domain associated with the time-series data. This is described in connection with 214 in FIG. 2, where the processing system 204 applies tagging to the data using domain-specific patterns, providing additional granularity and context.

Method 500 continues to block 530 with generating a data structure based on the time-series data, wherein the data structure includes: a fact structure including information of the set of fields, and a set of dimension structures associated with the fact structure, wherein the set of dimension structures are based on the categories or the tags. This is described in connection with 216 in FIG. 2, where the processing system 204 generates a star schema-based data structure 218, organizing the data into a fact structure and associated dimension structures.

Method 500 continues to block 535 with generating a set of features based on the data structure and based on a time window. This is described in connection with 220 in FIG. 2, where the processing system 204 applies algorithms to the data structure 218 to generate features that are statistically robust and contextually relevant, based on a specified time window.

Method 500 continues to block 540 with providing the set of features to a machine learning module. This is described in connection with 222 in FIG. 2, where the generated features are provided to the machine learning module for use in training or inference.

Method 500 continues to block 545 with training a second machine learning model based on the set of features. This is described in connection with 222 in FIG. 2, where the second machine learning model is trained using the high-quality features generated from the processed time-series data, enabling improved accuracy and performance.

In some aspects, the set of patterns is based on a keyword pattern for a categorical field or a descriptive field of the set of fields.

In some aspects, block 525 includes assigning the tags to the plurality of transactions using a large language model and the one or more descriptive fields.

In some aspects, the time window has a variable length.

In some aspects, the data structure comprises a star schema data structure and the fact structure comprises transaction data, of the time-series data, regarding the plurality of transactions.

In some aspects, the set of dimension structures comprise a dimension, associated with the transaction data, that is mapped to the fact structure.

In some aspects, a feature, of the set of features, comprises a statistical metric regarding the information relating to the set of fields in the time window.

In some aspects, a feature, of the set of features, comprises an identified pattern regarding the information relating to the set of fields in the time window.

Method 500 provides a systematic and efficient approach to processing time-series data. By preprocessing the time-series data (block 515), the method transforms raw, unstructured, and noisy data into a clean and organized format, enabling downstream operations to extract meaningful insights. The use of a first ML model to assign categories (block 520) and the application of tagging based on domain-specific patterns (block 525) enrich the data with additional granularity and context, ensuring that the data reflects both temporal and contextual relationships useful for accurate machine learning model training. The generation of a star schema-based data structure (block 530) organizes the data into a fact structure and associated dimension structures, reducing dimensionality and noise while enabling efficient aggregation and analysis across multiple dimensions. This structured format facilitates the generation of features (block 535) that are statistically robust and contextually relevant, addressing the challenge of sparse or overly dense feature sets in traditional approaches. By providing these features to a machine learning module (block 540) and training a second machine learning model (block 545), the method ensures that the resulting model is equipped with high-quality input data that captures complex relationships within the time-series data, improving accuracy, performance, and robustness while reducing inconsistencies in outputs. In summary, method 500 acts as a technical solution to the problems of handling complex, noisy, and high-dimensional time-series data by introducing a systematic, structured, and context-aware approach to featurization, thereby providing improved model accuracy, reduced resource usage, and enhanced adaptability to evolving data patterns.

Note that FIG. 5 is just one example of a method, and other methods including fewer, additional, or alternative operations are possible consistent with this disclosure.

Figure 6:
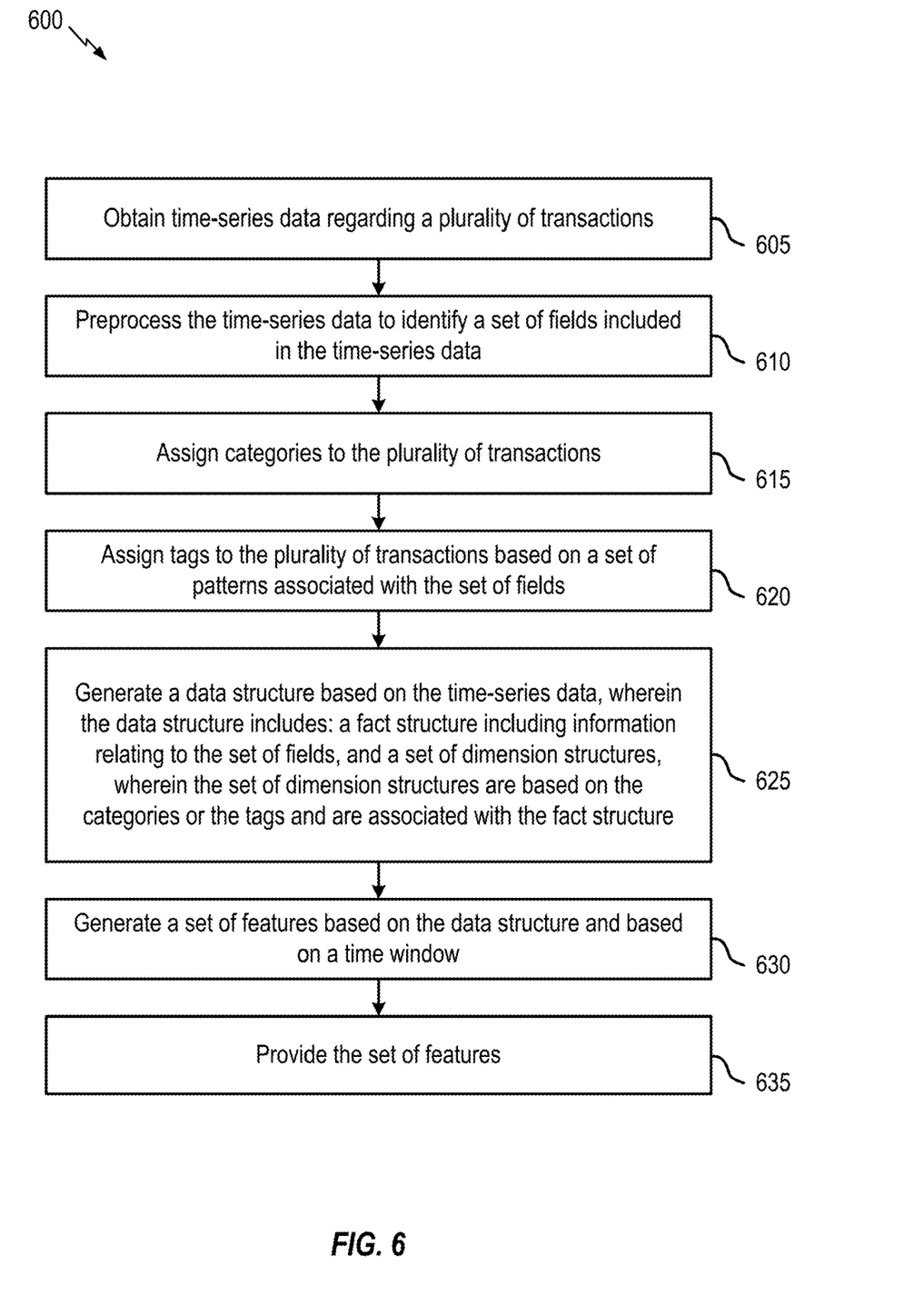
FIG. 6 illustrates a schematic flow chart diagram of a method for processing time-series data to generate features for machine learning models.

FIG. 6 depicts an example method 600 for processing time-series data. In some aspects, method 600 can be implemented by the processing system 204 of FIG. 2, a host 102, microservice 104, or client device 150 of FIG. 1, and/or processing system 700 of FIG. 7.

Method 600 starts at block 605 with obtaining time-series data regarding a plurality of transactions. This is described in connection with the data storage module 202 in FIG. 2, which stores raw time-series data for subsequent processing.

Method 600 continues to block 610 with preprocessing the time-series data to identify a set of fields included in the time-series data. This is described in connection with block 206 in FIG. 2, where the processing system 204 retrieves the stored time-series data from the data storage module 202.

Method 600 continues to block 615 with assigning categories to the plurality of transactions. This is described in connection with 208 in FIG. 2, where the processing system 204 preprocesses the raw time-series data to clean and structure it, identifying fields such as timestamp, amount, categorical, and descriptive fields.

Method 600 continues to block 620 with assigning tags to the plurality of transactions based on a set of patterns associated with the set of fields. This is described in connection with 214 in FIG. 2, where the processing system 204 applies tagging to the data using domain-specific patterns, providing additional granularity and context.

Method 600 continues to block 625 with generating a data structure based on the time-series data, wherein the data structure includes: a fact structure including information relating to the set of fields, and a set of dimension structures, wherein the set of dimension structures are based on the categories or the tags and are associated with the fact structure. This is described in connection with block 216 in FIG. 2, where the processing system 204 generates a star schema-based data structure 218, organizing the data into a fact structure and associated dimension structures.

Method 600 continues to block 630 with generating a set of features based on the data structure and based on a time window. This is described in connection with 220 in FIG. 2, where the processing system 204 applies algorithms to the data structure 218 to generate features that are statistically robust and contextually relevant, based on a specified time window.

Method 600 continues to block 635 with providing the set of features. This is described in connection with block 222 in FIG. 2, where the generated features are provided to the machine learning module for use in training or inference.

In some aspects, block 635 includes training a second machine learning model, according to the set of features, using a machine learning algorithm. This is described in connection with block 222 in FIG. 2, where the second machine learning model is trained using the high-quality features generated from the processed time-series data, enabling improved accuracy and performance.

In some aspects, the set of fields comprises one or more of: a timestamp field, an amount field, a categorical field, or a descriptive field.

In some aspects, block 615 includes assigning the categories using a first machine learning model.

In some aspects, the first machine learning model comprises a classification model.

In some aspects, the set of patterns is based on a keyword pattern for a categorical field or a descriptive field of the set of fields.

In some aspects, block 620 includes assigning the tags to the plurality of transactions using a large language model and a descriptive field of the set of fields.

In some aspects, block 630 includes generating the set of features using a set of statistical techniques.

FIG. 6 illustrates a method 600 for processing time-series data, providing a structured and context-aware approach to featurization. The method 600 begins by obtaining raw time-series data (block 605) and preprocessing it to identify relevant fields (block 610), transforming noisy and unstructured data into a clean and organized format suitable for analysis. Categories are assigned to transactions using a machine learning model (block 615), and tags are applied based on domain-specific patterns (block 620), enriching the data with temporal dependencies and contextual nuances that traditional methods often fail to capture. The method then generates a star schema-based data structure (block 625), which organizes the data into a fact structure and associated dimension structures, addressing issues of high dimensionality and noise while enabling efficient aggregation and multidimensional analysis. Features are generated based on this structured data and a time window (block 630), ensuring that the features are statistically robust, contextually relevant, and responsive to the temporal characteristics of the data. Finally, the features are provided for use in machine learning applications (block 635), enabling the training of models with high-quality input data that captures complex relationships within the time-series data. By systematically addressing the challenges of handling complex, noisy, and high-dimensional time-series data, method 600 provides technical benefits, including improved model accuracy, reduced resource usage, and enhanced adaptability to evolving data patterns, thereby providing a robust technical solution to the problems identified in the introduction.

Note that FIG. 6 is just one example of a method, and other methods including fewer, additional, or alternative operations are possible consistent with this disclosure.

Example Processing System for [Short Description]

Figure 7:
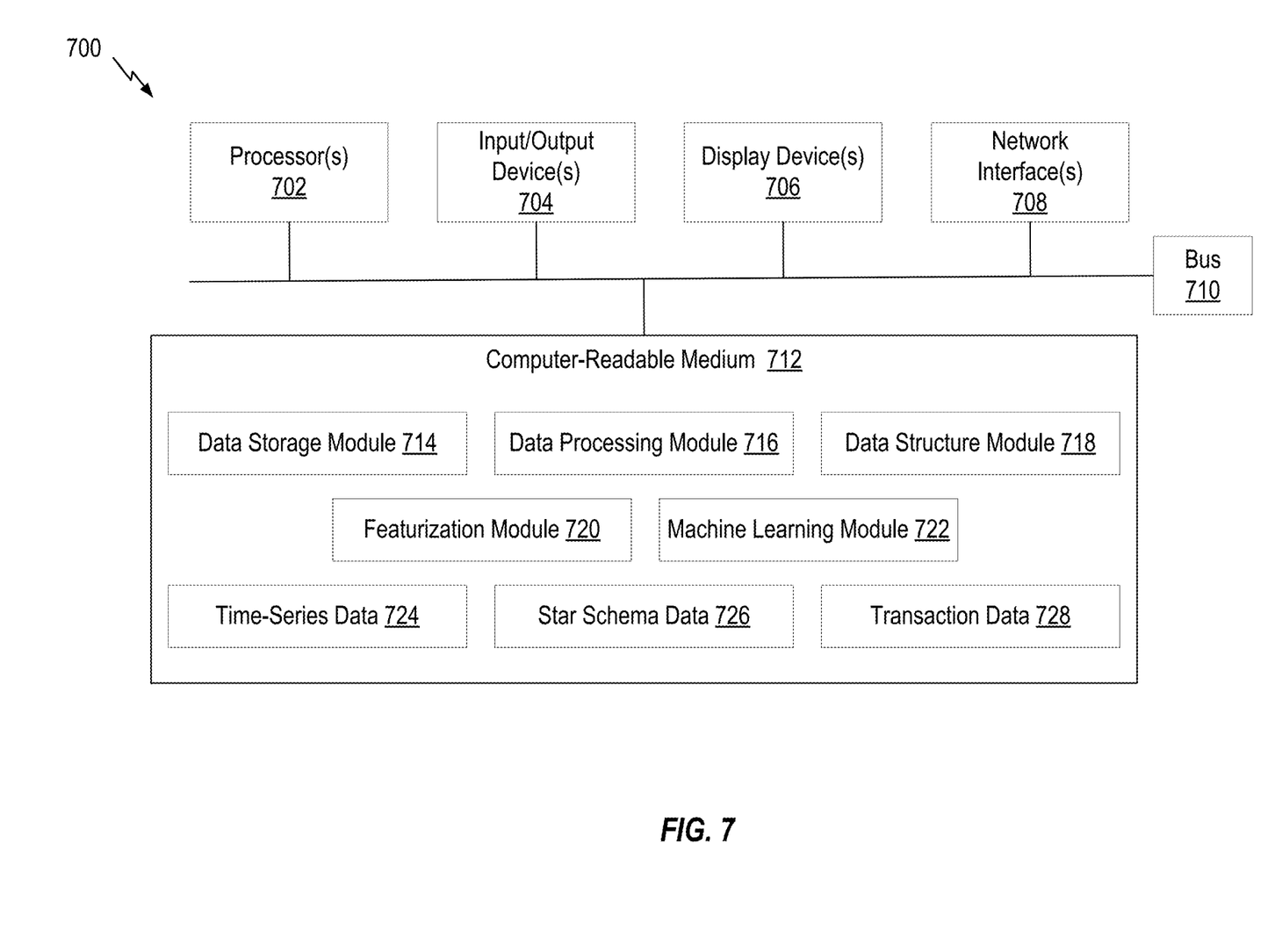
FIG. 7 is a block diagram illustrating an example processing system configured to perform time-series data featurization.

FIG. 7 depicts an example processing system 700 configured to perform various aspects described herein, including, for example, method 500 as described above with respect to FIG. 5 and/or the method 600 as described above with respect to FIG. 6.

Processing system 700 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of one or more central processing units (CPUs), graphics processing units (GPUs), tensor processing units (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 706 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes data storage module 714, data processing module 716, data structure module 718, featurization module 720, and machine learning module 722. Processing of the components 714-722 may enable and cause the processing system 700 to perform the method 500 described with respect to FIG. 5, or any aspect related to it, and/or the method 600 described with respect to FIG. 6, or any aspect related to it.

In certain embodiments, data storage module 714 is configured to store time-series data 724 regarding a plurality of transactions. Data storage module 714 may be an example of storage 106 or data storage module 202.

In certain embodiments, data processing module 716 is configured to obtain the time-series data 724 from the data storage module 714; preprocess the time-series data 724 to identify a set of fields included in the time-series data 724, the set of fields including one or more descriptive fields; assign, using a first machine learning model and based on the one or more descriptive fields, categories to the time-series data 724; and assign tags to the time-series data 724 based on a set of patterns associated with the set of fields, wherein the set of patterns are based on a domain associated with the time-series data 724. Data processing module 716 may be an example of a microservice 104.

In certain embodiments, data structure module 718 is configured to generate a data structure based on the time-series data 724, wherein the data structure includes: a fact structure including information of the set of fields, and a set of dimension structures associated with the fact structure, wherein the set of dimension structures are based on the categories or the tag. Data structure module 718 may be an example of a microservice 104.

In certain embodiments, featurization module 720 is configured to generate a set of features based on the data structure and based on a time window; and provide the set of features to a machine learning module. Featurization module 720 may be an example of a microservice 104.

In certain embodiments, machine learning module 722 is configured to train a second machine learning model based on the set of features.

In certain embodiments, the data structure comprises a star schema 726 structure and the fact structure comprises transaction data 728, of the time-series data 724, regarding the plurality of transactions. The processing system of claim 5, wherein the set of dimension structures comprises a dimension, associated with the time-series data 724, that is mapped to the fact structure.

Note that FIG. 7 is just one example of a processing system consistent with aspects described herein, and other processing systems having additional, alternative, or fewer components are possible consistent with this disclosure.

Implementation examples are described in the following numbered clauses:

Clause 1: A method, comprising: storing time-series data regarding a plurality of transactions; obtaining the time-series data from the data storage module; preprocessing the time-series data to identify a set of fields included in the time-series data, the set of fields including one or more descriptive fields; assigning, using a first machine learning model and based on the one or more descriptive fields, categories to the time-series data; assigning tags to the time-series data based on a set of patterns associated with the set of fields, wherein the set of patterns are based on a domain associated with the time-series data; generating a data structure based on the time-series data, wherein the data structure includes: a fact structure including information of the set of fields, and a set of dimension structures associated with the fact structure, wherein the set of dimension structures are based on the categories or the tags; generating a set of features based on the data structure and based on a time window; providing the set of features to a machine learning module; and training a second machine learning model based on the set of features.

Clause 2: The method of Clause 1, wherein the set of patterns is based on a keyword pattern for a categorical field or a descriptive field of the set of fields.

Clause 3: The method of any one of Clauses 1-2, wherein assigning the tags to the time-series data comprises assigning the tags to the plurality of transactions using a large language model and the one or more descriptive fields.

Clause 4: The method of any one of Clauses 1-3, wherein the time window has a variable length.

Clause 5: The method of any one of Clauses 1-4, wherein the data structure comprises a star schema data structure and the fact structure comprises transaction data, of the time-series data, regarding the plurality of transactions.

Clause 6: The method of Clause 5, wherein the set of dimension structures comprises a dimension, associated with the transaction data, that is mapped to the fact structure.

Clause 7: The method of any one of Clauses 1-6, wherein a feature, of the set of features, comprises a statistical metric regarding the information relating to the set of fields in the time window.

Clause 8: The method of any one of Clauses 1-7, wherein a feature, of the set of features, comprises an identified pattern regarding the information relating to the set of fields in the time window.

Clause 9: A method of processing time-series data performed by an apparatus, comprising: obtaining time-series data regarding a plurality of transactions; preprocessing the time-series data to identify a set of fields included in the time-series data; assigning categories to the plurality of transactions; assigning tags to the plurality of transactions based on a set of patterns associated with the set of fields; generating a data structure based on the time-series data, wherein the data structure includes: a fact structure including information relating to the set of fields, and a set of dimension structures, wherein the set of dimension structures are based on the categories or the tags and are associated with the fact structure; generating a set of features based on the data structure and based on a time window; and providing the set of features.

Clause 10: The method of Clause 9, wherein providing the set of features comprises training a second machine learning model, according to the set of features, using a machine learning algorithm.

Clause 11: The method of any one of Clauses 9-10, wherein the set of fields comprises one or more of: a timestamp field, an amount field, a categorical field, or a descriptive field.

Clause 12: The method of any one of Clauses 9-11, wherein assigning the categories comprises assigning the categories using a first machine learning model.

Clause 13: The method of Clause 12, wherein the first machine learning model comprises a classification model.

Clause 14: The method of any one of Clauses 9-13, wherein the set of patterns is based on a keyword pattern for a categorical field or a descriptive field of the set of fields.

Clause 15: The method of any one of Clauses 9-14, wherein assigning the tags to the plurality of transactions further comprises assigning the tags to the plurality of transactions using a large language model and a descriptive field of the set of fields.

Clause 16: The method of any one of Clauses 9-15, wherein generating the set of features further comprises generating the set of features using a set of statistical techniques.

Clause 17: A processing system, comprising: memory comprising computer-executable instructions; and one or more processors configured to execute the computer-executable instructions and cause the processing system to perform a method in accordance with any one of Clauses 1-16.

Clause 18: A processing system, comprising means for performing a method in accordance with any one of Clauses 1-16.

Clause 19: A non-transitory computer-readable medium storing program code for causing a processing system to perform the steps of any one of Clauses 1-16.

Clause 20: A computer program product embodied on a computer-readable storage medium comprising code for performing a method in accordance with any one of Clauses 1-16.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system, comprising:
    a data storage module configured to store time-series data regarding a plurality of transactions;
    a data processing module configured to:
        obtain the time-series data from the data storage module;
        preprocess the time-series data to identify a set of fields included in the time-series data, the set of fields including one or more descriptive fields;
        assign, using a first machine learning model and based on the one or more descriptive fields, categories to the plurality of transactions; and
        assign tags to the plurality of transactions based on a set of patterns associated with the set of fields, wherein the set of patterns are based on a domain associated with the time-series data and comprises at least one keyword pattern derived from the one or more descriptive fields;
    a data structure module configured to generate a data structure based on the time-series data, wherein the data structure includes:
        a fact structure including information of the set of fields, and
        a set of dimension structures associated with the fact structure, wherein a dimension structure in the set of dimension structures indicates a tag or a category assigned to a transaction in the plurality of transactions;
    a featurization module configured to:
        generate a set of features based on the data structure and based on a time window; and
        provide the set of features to a machine learning module; and
    the machine learning module configured to train, based on the set of features, a second machine learning model to estimate a long-term value of a customer to a business.

2. The processing system of claim 1, wherein the at least one keyword pattern comprises a dynamically generated rule identifying a word, a phrase, or a combination of text based on which to assign the tags to the plurality of transactions.

3. The processing system of claim 1, wherein the data processing module is configured to update using a large language model, the at least one keyword pattern to capture emerging behaviors or categories based on historical data trends.

4. The processing system of claim 1, wherein the time window has a variable length.

5. The processing system of claim 1, wherein the fact structure comprises transaction data, of the time-series data, regarding the plurality of transactions.

6. The processing system of claim 5, wherein the set of dimension structures comprises a dimension, associated with the transaction data, that is mapped to the fact structure.

7. The processing system of claim 1, wherein a feature, of the set of features, comprises a statistical metric regarding the information relating to the set of fields in the time window.

8. The processing system of claim 1, wherein a feature, of the set of features, comprises an identified pattern regarding the information relating to the set of fields in the time window.

9. The processing system of claim 1, wherein the set of fields comprises one or more of:
a timestamp field,
an amount field,
a categorical field, or
a descriptive field.

10. The processing system of claim 1, wherein the first machine learning model comprises a classification model.

11. A method of processing time-series data performed by an apparatus, comprising:
obtaining time-series data regarding a plurality of transactions;
preprocessing the time-series data to identify a set of fields included in the time-series data, the set of fields including one or more descriptive fields;
assigning, using a first machine learning model and based on the one or more descriptive fields, categories to the plurality of transactions;
assigning tags to the plurality of transactions based on a set of patterns associated with the set of fields, wherein the set of patterns are based on a domain associated with the time-series data and comprise at least one keyword pattern derived from the one or more descriptive fields;
generating a data structure based on the time-series data, wherein the data structure includes:
a fact structure including information relating to the set of fields, and
a set of dimension structures associated with the fact structure, wherein a dimension structure in the set of dimension structures indicates a tag or a category assigned to a transaction in the plurality of transactions;
generating a set of features based on the data structure and based on a time window; and
training, based on the set of features, a second machine learning model to estimate a long-term value of a customer to a business.

12. The method of claim 11, wherein the set of fields comprises one or more of:
a timestamp field,
an amount field,
a categorical field, or
a descriptive field.

13. The method of claim 11, wherein the first machine learning model comprises a classification model.

14. The method of claim 11, wherein the at least one keyword pattern comprises a dynamically generated rule identifying a word, a phrase, or a combination of text based on which to assign the tags to the plurality of transactions.

15. The method of claim 11, further comprising updating, using a large language model, the at least one keyword pattern to capture emerging behaviors or categories based on historical data trends.

16. The method of claim 11, wherein generating the set of features further comprises generating the set of features using a set of statistical techniques.

17. An apparatus, comprising a processing system that includes one or more memories and one or more processors coupled to the one or more memories, the processing system configured to cause the apparatus to:
obtain time-series data regarding a plurality of transactions;
preprocess the time-series data to identify a set of fields included in the time-series data, the set of fields including one or more descriptive fields;
assign, using a first machine learning model and based on the one or more descriptive fields, categories to the plurality of transactions;
assign tags to the plurality of transactions based on a set of patterns associated with the set of fields, wherein the set of patterns are based on a domain associated with the time-series data and comprises at least one keyword pattern derived from the one or more descriptive fields;
generate a data structure based on the time-series data, wherein the data structure includes:
a fact structure including information of the set of fields, and
a set of dimension structures associated with the fact structure, wherein a dimension in the set of dimension structures indicates a tag or a category assigned to a transaction in the plurality of transactions;
generate a set of features based on the data structure and based on a time window; and
train, based on the set of features, a second machine learning model to estimate a long-term value of a customer to a business.

18. The apparatus of claim 17, wherein the fact structure comprises transaction data, of the time-series data, regarding the plurality of transactions.

19. The apparatus of claim 18, wherein the set of dimension structures comprises a dimension, associated with the transaction data, that is mapped to the fact structure.

20. The apparatus of claim 17, wherein a feature, of the set of features, comprises a statistical metric regarding the information relating to the set of fields in the time window or an identified pattern regarding the information relating to the set of fields in the time window.

* * * * *